(12) United States Patent
Chung et al.

(10) Patent No.: US 11,391,347 B2
(45) Date of Patent: Jul. 19, 2022

(54) CYCLOID SPEED REDUCER WITH ENHANCED DYNAMIC BALANCE

(71) Applicant: Delta Electronics, Inc., Taoyuan (TW)

(72) Inventors: Chi-Wen Chung, Taoyuan (TW); En-Yi Chu, Taoyuan (TW); Hung-Wei Lin, Taoyuan (TW); Ming-Li Tsao, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 378 days.

(21) Appl. No.: 16/740,097

(22) Filed: Jan. 10, 2020

(65) Prior Publication Data
US 2020/0232542 A1    Jul. 23, 2020

Related U.S. Application Data

(60) Provisional application No. 62/793,672, filed on Jan. 17, 2019.

(30) Foreign Application Priority Data

Jun. 26, 2019  (CN) .......................... 201910559825.X

(51) Int. Cl.
*F16H 1/32*    (2006.01)
(52) U.S. Cl.
CPC .......... *F16H 1/32* (2013.01); *F16H 2001/328* (2013.01)
(58) Field of Classification Search
CPC .............................. F16H 2001/328; F16H 1/32
See application file for complete search history.

(56) References Cited

U.S. PATENT DOCUMENTS

| | | | | |
|---|---|---|---|---|
| 1,392,508 A | * | 10/1921 | Krohn | F16H 1/32 475/181 |
| 4,023,441 A | * | 5/1977 | Osterwalder | F16H 1/32 475/181 |
| 4,282,777 A | * | 8/1981 | Ryffel | F16H 1/32 418/61.3 |
| 4,487,091 A | * | 12/1984 | Pierrat | F16H 1/32 475/168 |

(Continued)

FOREIGN PATENT DOCUMENTS

| CN | 1426154 A | 6/2003 |
|---|---|---|
| CN | 101000081 A | 7/2007 |

(Continued)

*Primary Examiner* — Terence Boes
(74) *Attorney, Agent, or Firm* — Kirton McConkie; Evan R. Witt

(57) ABSTRACT

A cycloid speed reducer includes a weight element, an input shaft and a cycloid disc. The weight element is disposed within an accommodation space of the cycloid disc. An eccentric part is disposed on the input shaft. Since the length of the input shaft is reduced, the overall length of the cycloid speed reducer is shortened. Moreover, the mass center of the weight element and the mass center of the eccentric part and the cycloid disc are arranged along the same axial direction. That is, the line passing through the mass center of the weight element and the mass center of the eccentric part and the cycloid disc is perpendicular to the input shaft. Consequently, the efficacy of the dynamic balance of the cycloid speed reducer is enhanced.

13 Claims, 7 Drawing Sheets

(56) References Cited

U.S. PATENT DOCUMENTS

| | | | | |
|---|---|---|---|---|
| 4,807,494 A | * | 2/1989 | Lew | F16H 3/70 |
| | | | | 475/167 |
| 2020/0141478 A1 | * | 5/2020 | Chung | H02K 7/075 |
| 2020/0144888 A1 | * | 5/2020 | Chung | H02K 15/165 |

FOREIGN PATENT DOCUMENTS

| | | |
|---|---|---|
| CN | 201843949 U | 5/2011 |
| CN | 107559388 A | 1/2018 |
| CN | 208024801 U | 10/2018 |
| CN | 109114173 A | 1/2019 |
| JP | H11146620 A | 5/1999 |
| TW | M524897 U | 7/2016 |
| TW | I548823 B | 9/2016 |

* cited by examiner

CYCLOID SPEED REDUCER WITH ENHANCED DYNAMIC BALANCE

CROSS-REFERENCE TO RELATED APPLICATION

This application claims the benefit of U.S. Provisional Application No. 62/793,672 filed on Jan. 17, 2019, and entitled "SPEED REDUCER". This application claims priority to China Patent Application No. 201910559825.X filed on Jun. 26, 2019. The entire contents of the above-mentioned patent applications are incorporated herein by reference for all purposes.

FIELD OF THE INVENTION

The present disclosure relates to a speed reducer, and more particularly to a cycloid speed reducer with enhanced dynamic balance.

BACKGROUND OF THE INVENTION

Generally, a motor is operated at a high speed and a low torsion force. In other words, it is difficult to drive a large-sized load. Consequently, for allowing the motor to drive a heavy object, a speed reducer is used for reducing the rotating speed of the motor and increasing the torsion force.

Conventionally, the speed reducers are classified into several types, including rotary vector (RV) reducers, harmonic drive reducers and cycloid speed reducers. For example, the RV-E series reducer is a two-stage speed reducer produced by Nabtesco. The RV-E series reducer comprises a first speed reduction stage with a spur gear and a second speed reduction stage with an epicyclic gear. The gears of the first speed reduction stage and the second speed reduction stage are made of metallic material. The RV-E series reducer is a two-stage reduction design to reduce vibration and inertia while increasing ratio capabilities. The RV-E series reducer provides high-end performance in highly rigidity and high reduction ratio configurations, and the rolling contact elements of the RV-E series reducer have high efficiency and long life. However, since the RV-E series reducer has larger volume and weight and has many components, the cost of the RV-E series reducer is high.

The harmonic drive reducer comprises a wave generator, a flexible element (e.g., a flexible gear) and a rigid gear. The elastic deformation of the flexible element can be controlled to result in a pushing action so as to transmit motion and power of mechanical transmission. The harmonic drive reducer has smaller size, lighter weight and higher precision when compared with the RV reducer. However, since the rigidity of the flexible element of the harmonic drive reducer is low, the harmonic drive reducer is unable to withstand high impact and has a problem of causing teeth difference friction. In other words, the use life of the harmonic drive reducer is shorter. Moreover, since the input speed of the harmonic drive reducer is not high, the reduction ratio of the harmonic drive reducer is lower.

Conventionally, a cycloid speed reducer comprises an input shaft and a cycloid disc. During operations of the cycloid speed reducer, the cycloid disc is rotated with an eccentric part of the input shaft. Consequently, the cycloid disc is eccentrically rotated about the axel center of the input shaft. In addition, a power output shaft is rotated with the cycloid disc. The conventional cycloid speed reducer has many benefits such as high transmission ratio, compact structure and high transmission efficiency comparing with the RV reducer and the harmonic drive reducer. However, since the cycloid disc of the conventional cycloid speed reducer is eccentrically rotated with the eccentric part of the input shaft, it is necessary to additionally install a weight element. Due to the weight element, the dynamic balance can be achieved when the input shaft is rotated at a high speed.

FIG. 1 schematically illustrates the relationship between the mass center of the weight element and the overall mass center of the eccentric part and the cycloid disc in the conventional cycloid speed reducer. The weight element of the conventional cycloid speed reducer is helpful to achieve the dynamic balance. However, due to the spatial limitations of the input shaft and the cycloid disc of the conventional cycloid speed reducer, the weight element is disposed on the input shaft only, and the positions of the weight element and the eccentric part on the input shaft are different. In other words, for installing the eccentric part and the weight element, the input shaft should be long enough. Under this circumstance, the overall length and the overall volume of the cycloid speed reducer are increased. As shown in FIG. 1, M1 is the overall mass center of the eccentric part and the cycloid disc, and M2 is the mass center of the weight element. Since the positions of the weight element and the eccentric part on the input shaft are different, the mass center M1 and the mass center M2 are not arranged along the same axial direction. Consequently, the torque of the mass center M1 relative to the input shaft L and the torque of the mass center M2 relative to the input shaft L are not balanced. That is, the dynamic balance of the cycloid speed reducer is not optimized.

Therefore, there is a need of providing a cycloid speed reducer capable of achieving enhanced dynamic balance in order to the overcome the above drawbacks.

SUMMARY OF THE INVENTION

An object of the present disclosure provides a cycloid speed reducer with enhanced dynamic balance. The volume of the cycloid speed reducer is reduced, and the dynamic balance is optimized. Consequently, the drawbacks of the conventional technologies can be overcome.

In accordance with an aspect of the present disclosure, a cycloid speed reducer is provided. The cycloid speed reducer includes a first roller assembly, an input shaft, a cycloid disc, a second roller assembly and at least one weight element. The first roller assembly includes a first wheel disc and a plurality of first rollers. The first wheel disc has a first axial hole. The plurality of first rollers are disposed on the first wheel disc. The input shaft includes an eccentric part. The input shaft is rotatable and partially penetrated through the first axial hole. The eccentric part is eccentrically fixed on the input shaft. While the input shaft is rotated, the eccentric part is eccentrically rotated about an axel center of the input shaft. The cycloid disc includes an outer ring-shaped part, an inner ring-shaped part, a second axial hole and an accommodation space. The eccentric part is disposed in the second axial hole, so that the cycloid disc is rotated with the eccentric part. The outer ring-shaped part is located at an outer side of the cycloid disc. The outer ring-shaped part has a first outer wall and a first inner wall. A least one first tooth is formed on the first outer wall of the outer ring-shaped part. The at least one first tooth is in contact with the corresponding first roller. At least one second tooth is formed on the first inner wall of the outer ring-shaped part. The inner ring-shaped part is located at an inner side of the cycloid disc. The inner ring-shaped part has a second outer wall and a second inner wall. The second axial hole is defined by the second inner wall of the inner ring-shaped part. The accommodation space is arranged between the outer ring-shaped part and the inner ring-shaped part. The second roller assembly includes a second wheel disc and a plurality of second rollers. The second wheel disc has a third axial hole. The input shaft is disposed in the third axial hole. The plurality of second rollers are disposed on the second wheel disc. Each of the second rollers is in contact with the corresponding second tooth. The weight element is accommodated within the accommodation space, and disposed on the second outer wall of the inner ring-shaped part. When the cycloid disc is eccentrically rotated with the eccentric part of the input shaft, a radial force generated by the input shaft is balanced by the weight element.

From the above descriptions, the present disclosure provides a cycloid speed reducer with enhanced dynamic balance. The weight element is disposed within the accommodation space of the cycloid disc. That is, the input shaft is equipped with the eccentric part but not equipped with the weight element. Since the length of the input shaft is reduced, the overall length of the cycloid speed reducer is shortened. Moreover, the mass center of the weight element and the mass center of the eccentric part and the cycloid disc are arranged along the same axial direction. That is, the line passing through the mass center of the weight element and the mass center of the eccentric part and the cycloid disc is perpendicular to the input shaft. Consequently, the torque of the mass center of the weight element relative to the input shaft and the torque of the mass center of the eccentric part and the cycloid disc relative to the input shaft are balanced. In other words, the efficacy of the dynamic balance of the cycloid speed reducer is enhanced.

The above contents of the present disclosure will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
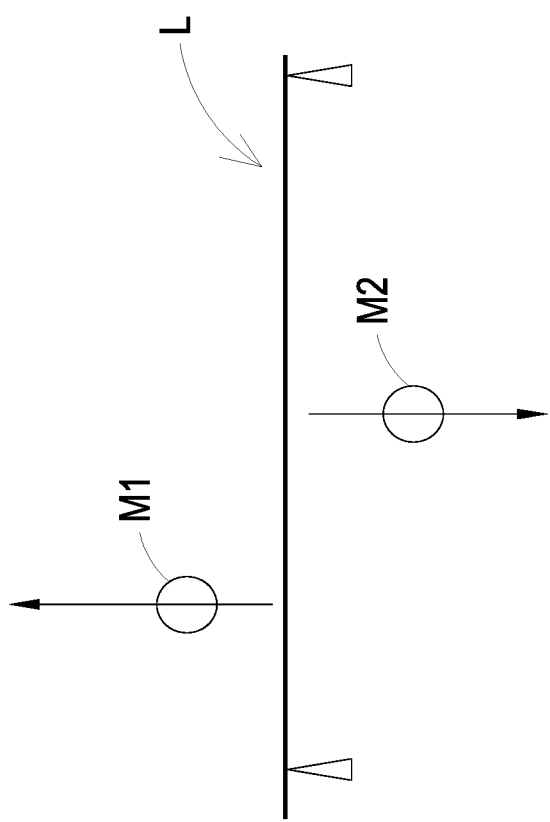
FIG. 1 schematically illustrates the relationship between the mass center of the weight element and the overall mass center of the eccentric part and the cycloid disc in the conventional cycloid speed reducer.
Figure 2:
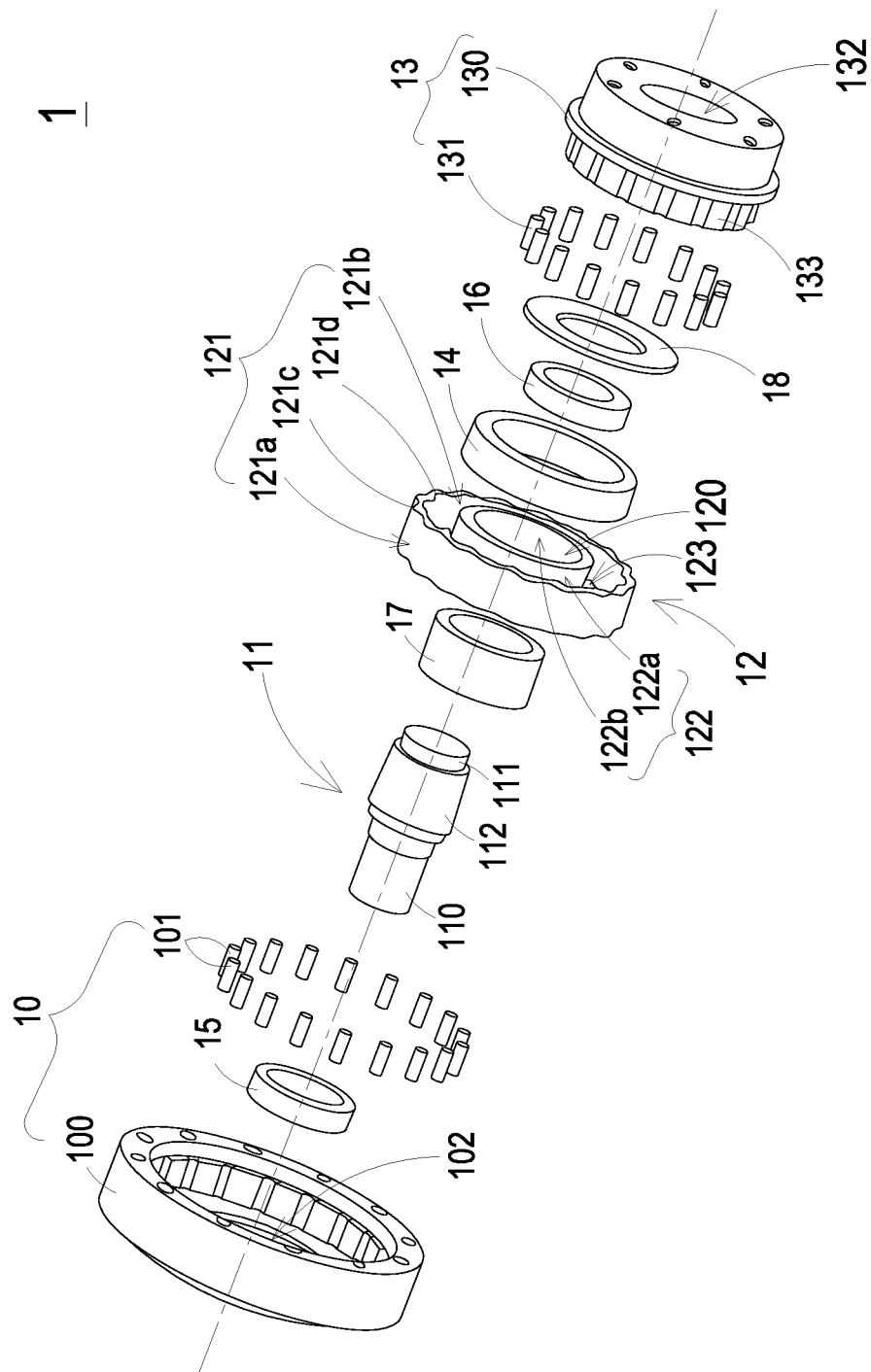
FIG. 2 is a schematic exploded view illustrating a cycloid speed reducer according to an embodiment of the present disclosure.
Figure 3:
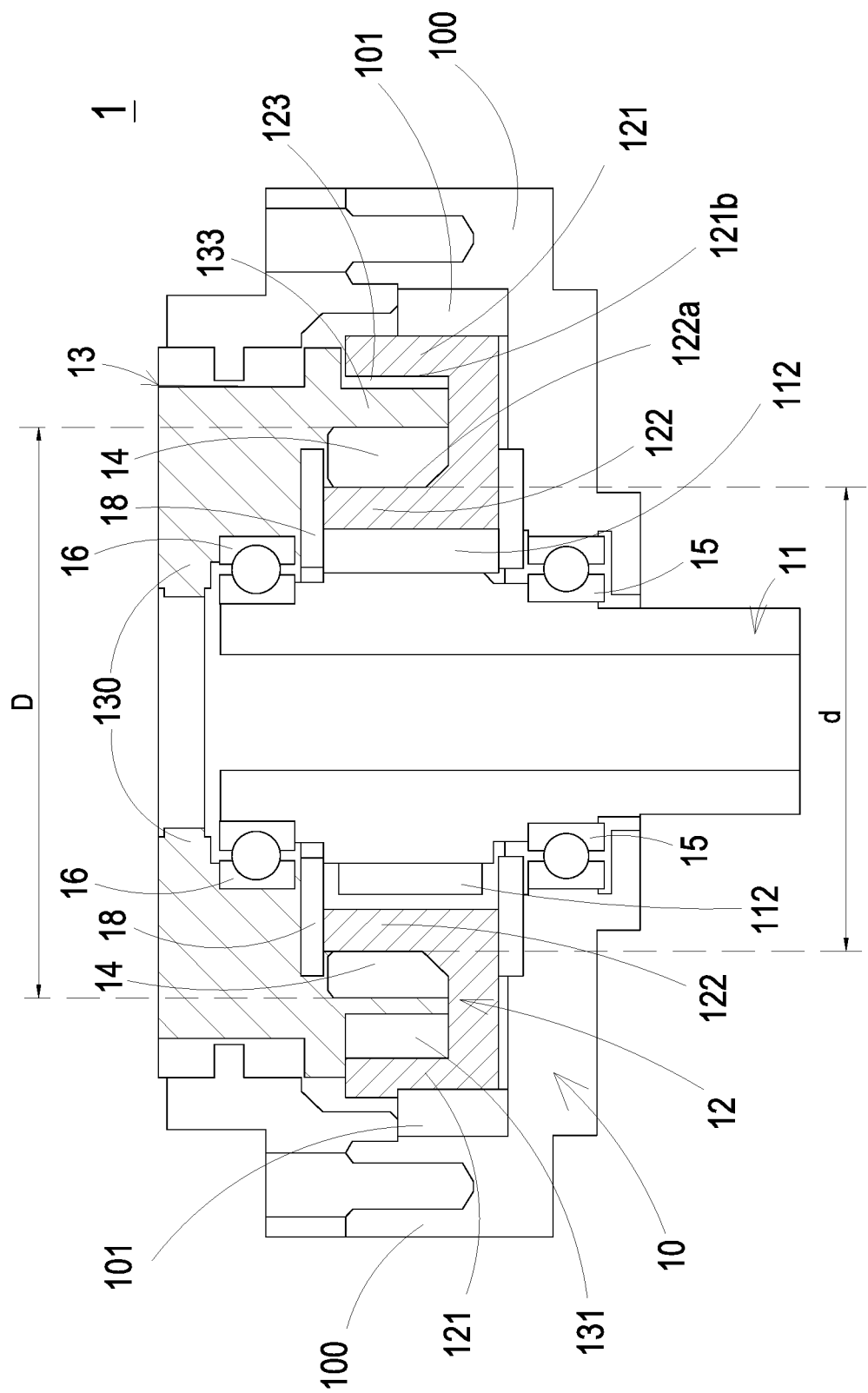
FIG. 3 is a schematic cross-sectional view illustrating the assembled structure of the cycloid speed reducer as shown in FIG. 2.
Figure 4:
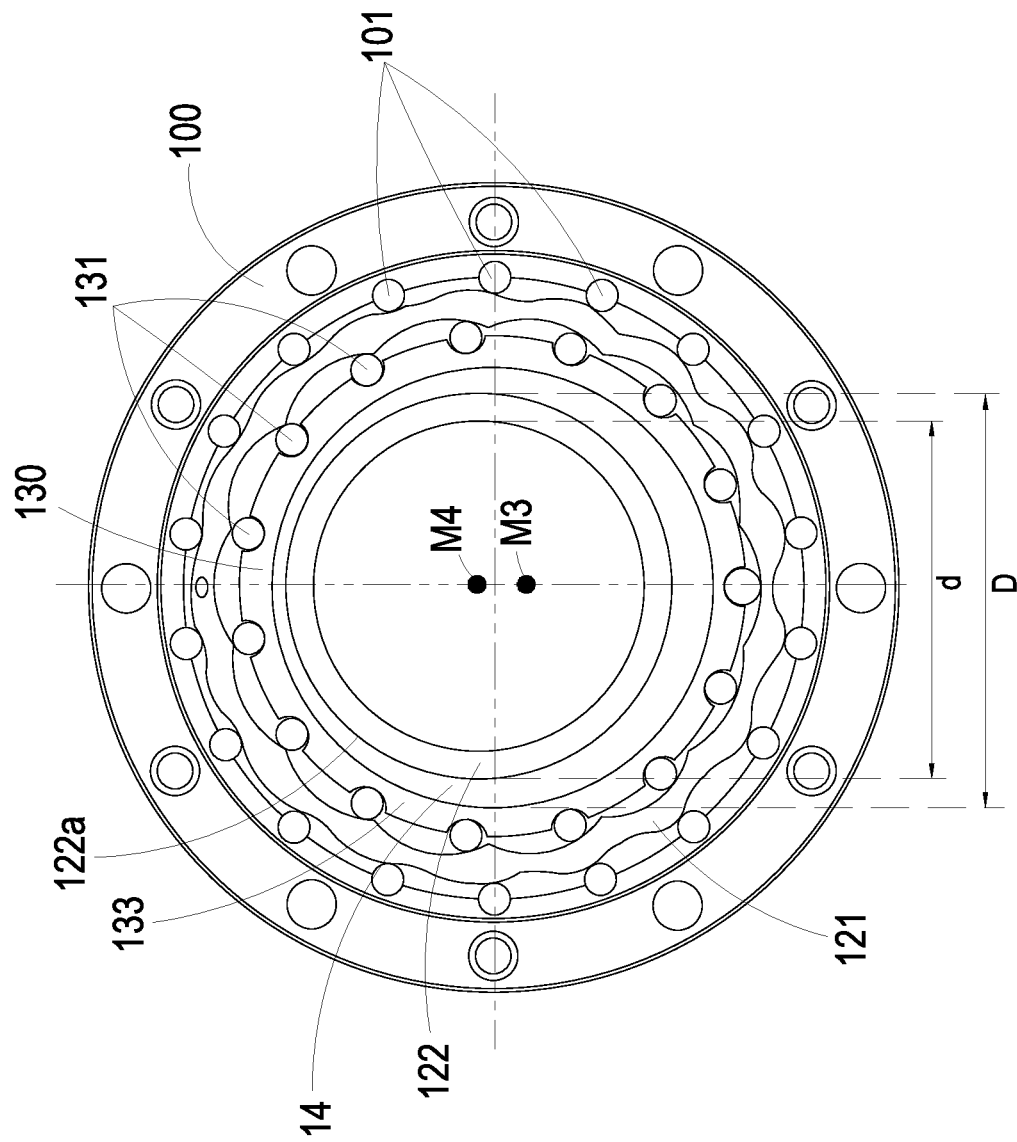
FIG. 4 schematically illustrates the combination of a cycloid disc, a first roller assembly, a second roller assembly and a weight element of the cycloid speed reducer as shown in FIG. 2.
Figure 5:
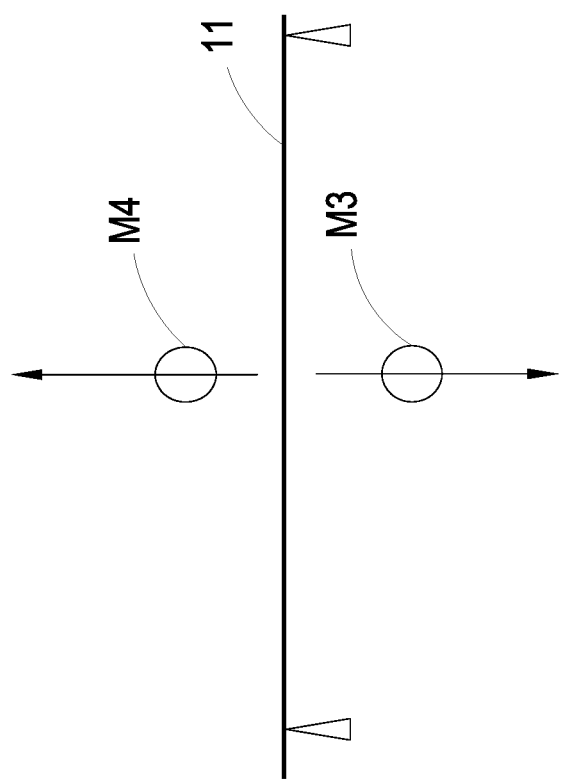
FIG. 5 schematically illustrates the relationship between the mass center of the weight element and the overall mass center of the eccentric part and the cycloid disc in the cycloid speed reducer as shown in FIG. 2.

Please refer to FIGS. 2, 3, 4 and 5. FIG. 2 is a schematic exploded view illustrating a cycloid speed reducer according to an embodiment of the present disclosure. FIG. 3 is a schematic cross-sectional view illustrating the assembled structure of the cycloid speed reducer as shown in FIG. 2. FIG. 4 schematically illustrates the combination of a cycloid disc, a first roller assembly, a second roller assembly and a weight element of the cycloid speed reducer as shown in FIG. 2. FIG. 5 schematically illustrates the relationship between the mass center of the weight element and the overall mass center of the eccentric part and the cycloid disc in the cycloid speed reducer as shown in FIG. 2. The cycloid speed reducer 1 can be applied to motors, machine tools, robotic arms, automobiles, motorcycles or other power assisting devices in order to provide a speed reducing function.

In this embodiment, the cycloid speed reducer 1 is a two-stage cycloid speed reducer. The cycloid speed reducer 1 comprises a first roller assembly 10, an input shaft 11, a cycloid disc 12, a second roller assembly 13 and at least one weight element 14.

The first roller assembly 10 comprises a first wheel disc 100 and a plurality of first rollers 101. The first wheel disc 100 is a circular disc structure or a hollow cylindrical structure that is made of metallic material or alloy. Moreover, a first axial hole 102 is located at the geometric center of the first wheel disc 100. Preferably but not exclusively, the plurality of first rollers 101 are circular posts, which are made of metallic material or alloy. Moreover, as shown in FIG. 4, the plurality of first rollers 101 are circumferentially and discretely arranged on an installation surface of the first wheel disc 100 at regular intervals. Optionally, the plurality of first rollers 101 are rotatable about their own axles (i.e., self-rotation). In this embodiment, the plurality of first rollers 101 are rotatable about or not rotatable about the axle center of the input shaft 11. In other words, while the first wheel disc 100 of the first roller assembly 10 is rotated, the plurality of first rollers 101 are rotated about the axel center of the input shaft 11.

The input shaft 11 is a shaft lever that is made of metallic material or alloy. The input shaft 11 can be driven to rotate by a motor (not shown). Consequently, the input shaft 11 is a power input terminal of the cycloid speed reducer 1. The input shaft 11 has a first end 110 and a second end 111. The input shaft 11 is penetrated through the first axial hole 102. Consequently, the first end 110 and the second end 111 are located beside two opposite sides of the first wheel disc 100. Moreover, the first end 110 of the input shaft 11 is partially accommodated within the first axial hole 102. The input shaft 11 further comprises an eccentric part 112. The eccentric part 112 is eccentrically fixed on the input shaft 11 and arranged between the first end 110 and the second end 111. While the input shaft 11 is rotated, the eccentric part 112 is rotated with the input shaft 11 and eccentrically rotated about the axle center of the input shaft 11.

Preferably but not exclusively, the cycloid disc 12 is made of metallic material or alloy. The cycloid disc 12 comprises a second axial hole 120, an outer ring-shaped part 121, an inner ring-shaped part 122 and an accommodation space 123. The second axial hole 120 is located at the geometric center of the cycloid disc 12. The eccentric part 112 is disposed in the second axial hole 120. Consequently, while the eccentric part 112 is rotated, the cycloid disc 12 is rotated with the eccentric part 112. The outer ring-shaped part 121 is aligned with the inner ring-shaped part 122, and located at the outer side of the cycloid disc 12. The outer ring-shaped part 121 has a first outer wall 121a and a first inner wall 121b. At least one first tooth 121c is formed on the first outer wall 121a of the outer ring-shaped part 121. Preferably, a plurality of first teeth 121c are formed on the first outer wall 121a of the outer ring-shaped part 121. The first tooth 121c is in contact with the corresponding first roller 101. At least one second tooth 121d is formed on the first inner wall 121b of the outer ring-shaped part 121. Preferably, a plurality of second teeth 121d are formed on the first inner wall 121b of the outer ring-shaped part 121. The inner ring-shaped part 122 is aligned with the outer ring-shaped part 121, and located at the inner side of the cycloid disc 12. The inner ring-shaped part 122 has a second outer wall 122a and a second inner wall 122b. The second axial hole 120 is defined by the second inner wall 122b of the inner ring-shaped part 122. The accommodation space 123 is arranged between the first inner wall 121b of the outer ring-shaped part 121 and the second outer wall 122a of the inner ring-shaped part 122.

The second roller assembly 13 comprises a second wheel disc 130 and a plurality of second rollers 131. The second wheel disc 130 is a circular disc structure that is made of metallic material or alloy. Moreover, a third axial hole 132 is located at the geometric center of the second wheel disc 130. The second end 111 of the input shaft 11 is disposed in the third axial hole 132. Preferably but not exclusively, the plurality of second rollers 131 are circular posts, which are made of metallic material or alloy. Moreover, as shown in FIG. 4, the plurality of second rollers 131 are circumferentially and discretely arranged on the second wheel disc 130 at regular intervals. Each of the second rollers 131 is partially accommodated within the accommodation space 123 and in contact with the corresponding second tooth 121d. While the cycloid disc 12 is synchronously rotated with the eccentric part 112, the second rollers 131 are pushed against the corresponding second tooth 121d. Consequently, the second wheel disc 130 is rotated. Optionally, the plurality of second rollers 131 are rotatable about their own axles (i.e., self-rotation). In this embodiment, the plurality of second rollers 131 are rotatable about or not rotatable about the axle center of the input shaft 11. In other words, while the second wheel disc 130 is rotated, the plurality of second rollers 131 are rotated about the axel center of the input shaft 11. When the first rollers 101 and the first wheel disc 100 are rotated about the axle center of the input shaft 11, the plurality of second rollers 131 are not rotated. Under this circumstance, the first wheel disc 100 is served as a power output terminal of the cycloid speed reducer 1. Whereas, when the first rollers 101 and the first wheel disc 100 are not rotated, the plurality of second rollers 131 and the second wheel disc 130 are rotated about the axel center of the input shaft 11. Under this circumstance, the second wheel disc 130 is served as a power output terminal of the cycloid speed reducer 1.

The weight element 14 is accommodated within the accommodation space 123 of the cycloid disc 12 and disposed on the second outer wall 122a of the inner ring-shaped part 122 of the cycloid disc 12. When the cycloid disc 12 is eccentrically rotated with the eccentric part 112 of the input shaft 11, the radial force generated by the eccentric part 112 of the input shaft 11 can be balanced by the weight element 14. Please refer to FIGS. 4 and 5. As shown in FIGS. 4 and 5, M3 is the mass center of the weight element 14, and M4 is the overall mass center of the eccentric part 112 and the cycloid disc 12. In accordance with a feature of the present disclosure, the mass center M3 and the mass center M4 are arranged along the same axial direction. That is, the eccentric part 112 and the weight element 14 are in the radial arrangement. Especially, the line passing through the mass center M3 and the mass center M4 is perpendicular to the input shaft 11.

From the above descriptions, the weight element 14 of the cycloid speed reducer 1 is accommodated within the accommodation space 123 of the cycloid disc 12. That is, the input shaft 11 is equipped with the eccentric part 112 but not equipped with the weight element. Since the length of the input shaft 11 is reduced, the overall length of the cycloid speed reducer 1 is shortened. Moreover, the mass center M3 of the weight element 14 and the mass center M4 of the eccentric part 112 and the cycloid disc 12 are arranged along the same axial direction. That is, the line passing through the mass center M3 of the weight element 14 and the mass center M4 of the eccentric part 112 and the cycloid disc 12 is perpendicular to the input shaft 11. Consequently, the torque of the mass center M3 relative to the input shaft 11 and the torque of the mass center M4 relative to the input shaft 11 are balanced. In other words, the efficacy of the dynamic balance of the cycloid speed reducer 1 is enhanced.

Please refer to FIG. 3 again. In an embodiment, the second wheel disc 130 further comprises a ring-shaped extension part 133. The ring-shaped extension part 133 is accommodated within the accommodation space 123 of the cycloid disc 12. Particularly, the ring-shaped extension part 133 is arranged between the weight element 14 and the first inner wall 121b of the outer ring-shaped part 121. Preferably but not exclusively, the inner surface of the ring-shaped extension part 133 is contacted with and pressed against the weight element 14. The weight element 14 is arranged between the inner surface of the ring-shaped extension part 133 and the second outer wall 122a of the inner ring-shaped part 122. Due to the ring-shaped extension part 133, the weight element 14 can be firmly disposed on the second outer wall 122a of the inner ring-shaped part 122. Consequently, the rigidity of the cycloid speed reducer 1 is enhanced. Moreover, the plurality of second rollers 131 may be disposed on an outer surface of the ring-shaped extension part 133.

Please refer to FIG. 2 again. The cycloid speed reducer 1 further comprises a first outer bearing 15, a second outer bearing 16 and an inner bearing 17. The first outer bearing 15 is disposed in the first axial hole 102 and arranged between the first end 110 of the input shaft 11 and the first wheel disc 100. The input shaft 11 is rotatable within the first axial hole 102 through the first outer bearing 15. The second outer bearing 16 is disposed in the third axial hole 132 and arranged between the second end 111 of the input shaft 11 and the second wheel disc 130. The input shaft 11 is rotatable within the third axial hole 132 through the second outer bearing 16. The inner bearing 17 is disposed in the second axial hole 120 and arranged between the eccentric part 112 and the cycloid disc 12. The eccentric part 112 is rotatable within the second axial hole 120 through the inner bearing 17. Preferably but not exclusively, the first outer bearing 15, the second outer bearing 16 and the inner bearing 17 are deep-groove ball bearings.

Please refer to FIG. 3 again. In an embodiment, the cycloid speed reducer 1 further comprises a stopping ring 18 with a hollow portion. The stopping ring 18 is mounted around the input shaft 11 and arranged between the second wheel disc 130 of the second roller assembly 13 and the accommodation space 123 of the cycloid disc 12. Moreover, a portion of the stopping ring 18 is extended to a mouth part of the accommodation space 123. During the operation of the cycloid speed reducer 1, the position of the weight element 14 is limited by the stopping ring 18. Consequently, the weight element 14 is not ejected from the accommodation space 123 of the cycloid disc 12.

Hereinafter, three examples of the weight element will be described.

Figure 6B:
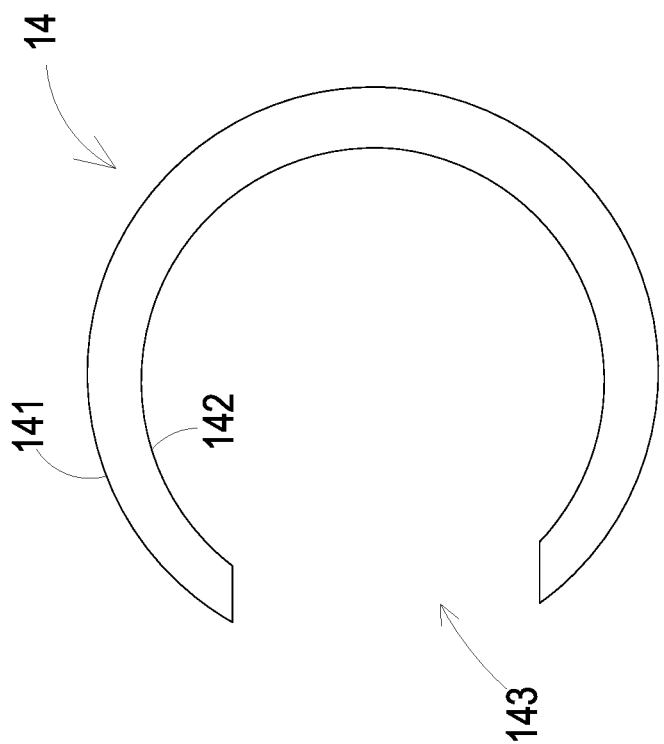
FIG. 6B schematically illustrates the structure of a second exemplary weight element used in the cycloid speed reducer as shown in FIG. 2.
Figure 6A:
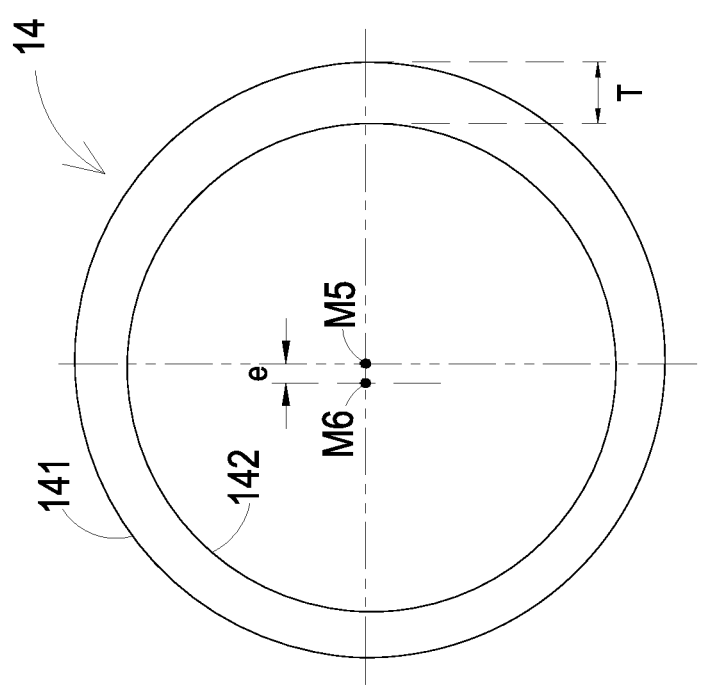
FIG. 6A schematically illustrates the structure of a first exemplary weight element used in the cycloid speed reducer as shown in FIG. 2.

FIG. 6A schematically illustrates the structure of a first exemplary weight element used in the cycloid speed reducer as shown in FIG. 2. Please refer to FIGS. 2, 3, 4 and 6A. In this example, the weight element 14 has a ring-shaped structure with a hollow part. The weight element 14 is mounted around the second outer wall 122a of the inner ring-shaped part 122. The weight element 14 has a third outer wall 141 and a third inner wall 142. A first eccentric amount e is formed between the center M5 of the third outer wall 141 of the weight element 14 and a center M6 of the third inner wall 142 of the weight element 14. The first eccentric amount e is equal to a second eccentric amount of the eccentric part 112. Due to the first eccentric amount e, the thickness of the weight element 14 is not uniformly distributed. That is, the weight element 14 comprises a thicker region and a thinner region. The largest distance between the third outer wall 141 and the third inner wall 142 of the weight element 14 is the largest thickness T of the weight element 14. Moreover, the relationships between the largest thickness T of the weight element 14, the inner diameter D of the ring-shaped extension part 133, the diameter d of the second outer wall 122a of the inner ring-shaped part 122 of the cycloid disc 12 and the first eccentric amount e may be expressed by the following formula: T=D−d+e.

Moreover, in case that the weight element 14 is a ring-shaped structure and mounted around the second outer wall 122a of the inner ring-shaped part 122, the positions of the thicker region and the thinner region of the weight element 14 are determined according to the eccentric direction of the eccentric part 112. Consequently, the radial force generated by the eccentric part 112 of the input shaft 11 can be balanced by the weight element 14. Please refer to FIG. 3. When the eccentric part 112 is eccentric toward the left side of the input shaft 11, the eccentric direction of the thicker region of the weight element 14 is opposite to the eccentric direction of the eccentric part 112. That is, the thicker region of the weight element 14 is located beside the right side of the input shaft 11. The eccentric direction of the thinner region of the weight element 14 is identical to the eccentric direction of the eccentric part 112. That is, the thinner region of the weight element 14 is located beside the left side of the input shaft 11.

FIG. 6B schematically illustrates the structure of a second exemplary weight element used in the cycloid speed reducer as shown in FIG. 2. Please refer to FIGS. 2, 3 and 6B. In this embodiment, the weight element 14 has a C-shaped structure. The weight element 14 has a third outer wall 141, a third inner wall 142 and a notch 143. The weight element 14 is mounted around the second outer wall 122a of the inner ring-shaped part 122. The size of the notch 143 may be determined according to the weighting requirement. A first eccentric amount e1 is formed between the center of the third outer wall 141 of the weight element 14 and the center of the third inner wall 142 of the weight element 14. Moreover, the relationships between the largest thickness T of the weight element 14, the inner diameter D of the ring-shaped extension part 133, the diameter d of the second outer wall 122a of the inner ring-shaped part 122 of the cycloid disc 12 and the first eccentric amount e1 may be expressed by the following formula: T=D−d+e1.

Figure 7:
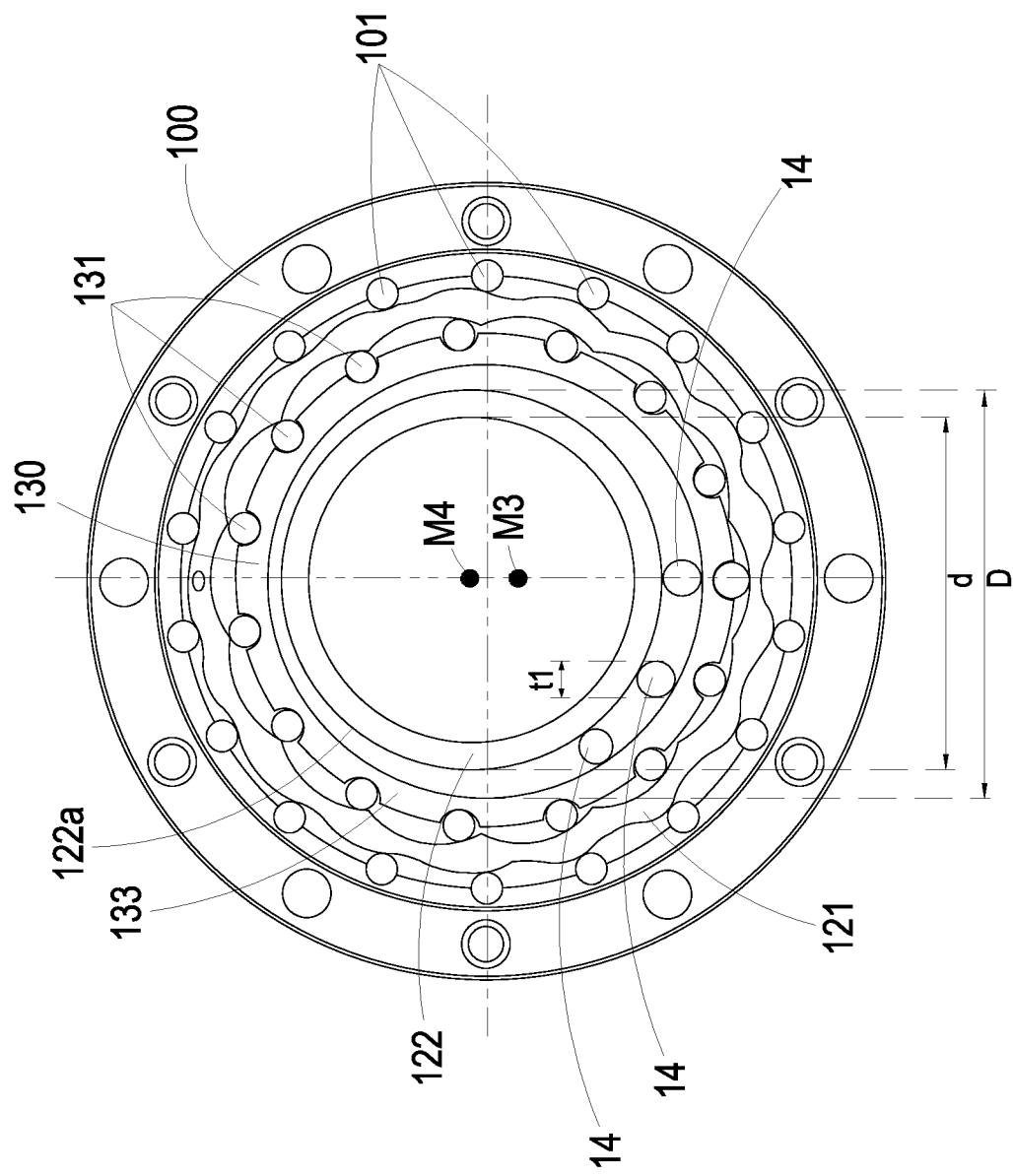
FIG. 7 schematically illustrates the structure of a third exemplary weight element, the cycloid disc, the first roller assembly and the second roller assembly of the cycloid speed reducer as shown in FIG. 2.

FIG. 7 schematically illustrates the structure of a third exemplary weight element, the cycloid disc, the first roller assembly and the second roller assembly of the cycloid speed reducer as shown in FIG. 2. Please refer to FIGS. 2, 3 and 7. It is noted that the structure of the weight element 14 is not restricted to the ring-shaped structure as shown in FIG. 6A and the C-shaped structure as shown in FIG. 6B. For example, in another embodiment, the weight element 14 has a protrusion structure or a ball structure. In addition, the number of the weight element 14 is not limited to one and may be varied according to the practical requirements. As shown in FIG. 7, the cycloid speed reducer 1 comprises three weight elements 14. The three weight elements 14 are disposed within the accommodation space 123 of the cycloid disc 12. Moreover, the three weight elements 14 are discretely arranged on the second outer wall 122a of the inner ring-shaped part 122 of the cycloid disc 12. Moreover, the relationships between the diameter t1 of the weight element 14, the inner diameter D of the ring-shaped extension part 133, the diameter d of the second outer wall 122a of the inner ring-shaped part 122 of the cycloid disc 12 and the first eccentric amount e2 may be expressed by the following formula: t1=D−d+e2.

The shape of the weight element 14 may be varied according to the weighting requirements. Alternatively, the present disclosure is not limited to vary the shape of the weight element 14 to meet the weighting requirement. In some other embodiments, the weight element 14 may be made of various materials with different densities according to the weighting requirement.

From the above descriptions, the present disclosure provides a cycloid speed reducer with enhanced dynamic balance. The weight element is disposed within the accommodation space of the cycloid disc. That is, the input shaft is equipped with the eccentric part but not equipped with the weight element. Since the length of the input shaft is reduced, the overall length of the cycloid speed reducer is shortened. Moreover, the mass center of the weight element and the mass center of the eccentric part and the cycloid disc are arranged along the same axial direction. That is, the line passing through the mass center of the weight element and the mass center of the eccentric part and the cycloid disc is perpendicular to the input shaft. Consequently, the torque of the mass center of the weight element relative to the input shaft and the torque of the mass center of the eccentric part and the cycloid disc relative to the input shaft are balanced. In other words, the efficacy of the dynamic balance of the cycloid speed reducer is enhanced.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cycloid speed reducer, comprising:
   a first roller assembly comprising a first wheel disc and a plurality of first rollers, wherein the first wheel disc has a first axial hole, and the plurality of first rollers are disposed on the first wheel disc;
   an input shaft comprising an eccentric part, wherein the input shaft is rotatable and partially penetrated through the first axial hole, and the eccentric part is eccentrically fixed on the input shaft, wherein while the input shaft is rotated, the eccentric part is eccentrically rotated about an axel center of the input shaft;
   a cycloid disc comprising an outer ring-shaped part, an inner ring-shaped part, a second axial hole and an accommodation space, wherein the eccentric part is disposed in the second axial hole, so that the cycloid disc is rotated with the eccentric part, wherein the outer ring-shaped part is located at an outer side of the cycloid disc, the outer ring-shaped part has a first outer wall and a first inner wall, at least one first tooth is formed on the first outer wall of the outer ring-shaped part, the at least one first tooth is in contact with the corresponding first roller, and at least one second tooth is formed on the first inner wall of the outer ring-shaped part, wherein the inner ring-shaped part is located at an inner side of the cycloid disc, the inner ring-shaped part has a second outer wall and a second inner wall, and the second axial hole is defined by the second inner wall of the inner ring-shaped part, wherein the accommodation space is arranged between the outer ring-shaped part and the inner ring-shaped part;
   a second roller assembly comprising a second wheel disc and a plurality of second rollers, wherein the second wheel disc has a third axial hole, the input shaft is disposed in the third axial hole, the plurality of second rollers are disposed on the second wheel disc, and each of the second rollers is in contact with the corresponding second tooth; and
   at least one weight element accommodated within the accommodation space, and disposed on the second outer wall of the inner ring-shaped part, wherein when the cycloid disc is eccentrically rotated with the eccentric part of the input shaft, a radial force generated by the input shaft is balanced by the weight element.

2. The cycloid speed reducer according to claim 1, wherein the weight element has a mass center, and the eccentric part and the cycloid disc have a mass center, wherein a line passing through the mass center of the weight element and the mass center of the eccentric part and the cycloid disc is perpendicular to the input shaft.

3. The cycloid speed reducer according to claim 1, wherein the second wheel disc further comprises a ring-shaped extension part, wherein the ring-shaped extension part is accommodated within the accommodation space of the cycloid disc, the ring-shaped extension part is arranged between the weight element and the first inner wall of the outer ring-shaped part, and the weight element is arranged between the ring-shaped extension part and the second outer wall of the inner ring-shaped part.

4. The cycloid speed reducer according to claim 3, wherein an inner surface of the ring-shaped extension part is contacted with and pressed against the weight element.

5. The cycloid speed reducer according to claim 3, wherein the plurality of second rollers are disposed on an outer surface of the ring-shaped extension part.

6. The cycloid speed reducer according to claim 3, wherein the weight element has a ring-shaped structure, and the weight element has a third outer wall and a third inner wall, wherein a first eccentric amount is formed between a center of the third outer wall of the weight element and a center of the third inner wall of the weight element, and the first eccentric amount is equal to a second eccentric amount of the eccentric part.

7. The cycloid speed reducer according to claim 6, wherein a relationship between the largest thickness T of the weight element, an inner diameter D of the ring-shaped extension part, a diameter d of the second outer wall of the inner ring-shaped part of the cycloid disc and the first eccentric amount e is expressed by a formula: $T=D-d+e$.

8. The cycloid speed reducer according to claim 3, wherein the weight element has a C-shaped structure, and the weight element has a third outer wall, a third inner wall and a notch, wherein a first eccentric amount is formed between a center of the third outer wall of the weight element and a center of the third inner wall of the weight element, and the first eccentric amount is equal to a second eccentric amount of the eccentric part.

9. The cycloid speed reducer according to claim 8, wherein a relationship between the largest thickness T of the weight element, an inner diameter D of the ring-shaped extension part, a diameter d of the second outer wall of the inner ring-shaped part of the cycloid disc and the first eccentric amount e1 is expressed by a formula: $T=D-d+e1$.

10. The cycloid speed reducer according to claim 3, wherein the weight element has a protrusion structure or a ball structure.

11. The cycloid speed reducer according to claim 10, wherein the at least one weight element comprises a plurality of weight elements, and the plurality of weight elements are discretely arranged on the second outer wall of the inner ring-shaped part of the cycloid disc.

12. The cycloid speed reducer according to claim 11, wherein a relationship between a diameter t1 of the weight element, an inner diameter D of the ring-shaped extension part, a diameter d of the second outer wall of the inner ring-shaped part of the cycloid disc and the first eccentric amount e2 is expressed by a formula: $t1=D-d+e2$.

13. The cycloid speed reducer according to claim 1, wherein the cycloid speed reducer further comprises a stopping ring, wherein the stopping ring is mounted around the input shaft and arranged between the second wheel disc of the second roller assembly and the accommodation space of the cycloid disc, and a portion of the stopping ring is extended to a mouth part of the accommodation space, wherein a position of the weight element is limited by the stopping ring.

* * * * *